United States Patent [19]  [11] Patent Number: 4,650,960
Bergersen  [45] Date of Patent: Mar. 17, 1987

[54] ELECTRICAL HEATING FOIL ELEMENT

[75] Inventor: Hans A. Bergersen, Oslo, Norway

[73] Assignee: Standard Telefon OG Kabelfabrik A/S, Norway

[21] Appl. No.: 749,348

[22] Filed: Jun. 27, 1985

[30] Foreign Application Priority Data

Jul. 13, 1984 [NO] Norway ................. 842869

[51] Int. Cl.⁴ ............................................. H05B 3/34
[52] U.S. Cl. ...................................... 219/213; 52/105; 219/345; 219/549
[58] Field of Search ............... 219/213, 345, 528, 529, 219/548, 549; 52/105, 474, 173 R

[56] References Cited

U.S. PATENT DOCUMENTS

| | | | |
|---|---|---|---|
| 2,570,376 | 10/1951 | Quist | 219/529 |
| 3,129,316 | 4/1964 | Glass | 219/345 |
| 3,445,628 | 5/1969 | Bateman | 219/345 |
| 3,766,644 | 10/1973 | Davis | 219/213 |
| 3,835,604 | 9/1974 | Hoffmann | 52/105 |
| 4,363,947 | 12/1982 | Bergersen | 219/213 |

FOREIGN PATENT DOCUMENTS

| | | | |
|---|---|---|---|
| 74410 | 12/1960 | France | 219/345 |
| 57-31736 | 2/1982 | Japan | 219/528 |
| 59-119121 | 7/1984 | Japan | 219/345 |

Primary Examiner—E. A. Goldberg
Assistant Examiner—Teresa J. Walberg
Attorney, Agent, or Firm—John T. O'Halloran; Mary C. Werner

[57] ABSTRACT

A laminated electrical heating foil element includes electrical resistance strips embedded between two sheets of insulation material to make the laminated heating element with its power supply terminal. The heating element is in particular adapted for horizontal floor mounting between adjacent floor joists, and each element may either be wider than the specified joist distance by approximately 2h, where "h" is the specified minimum distance to be left free above an installed element, or each element may be provided with fastening devices which may cooperate with complementary catching devices on the joists. Different fastening devices between joist and heating element, as well as easy-to-fold zones running along both side edges of the heating element, are included.

8 Claims, 15 Drawing Figures

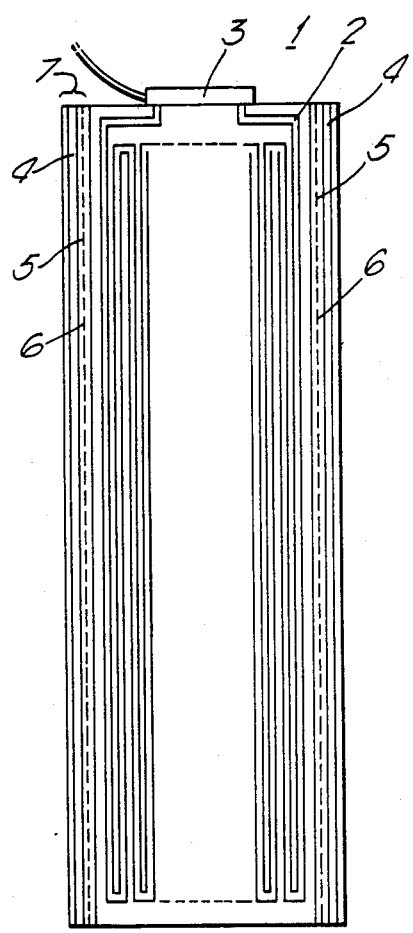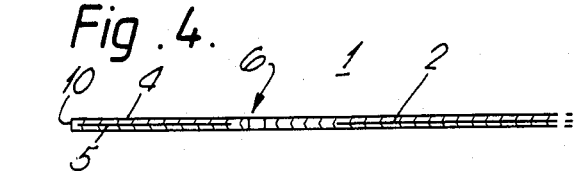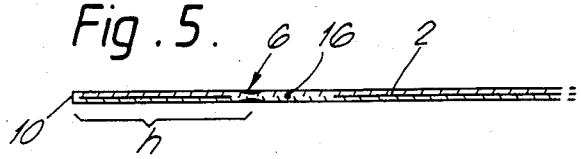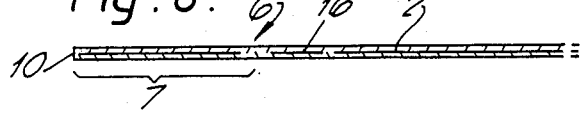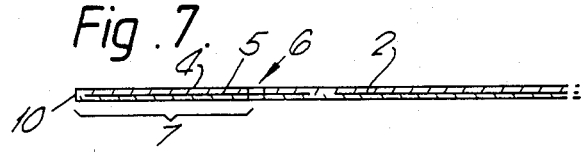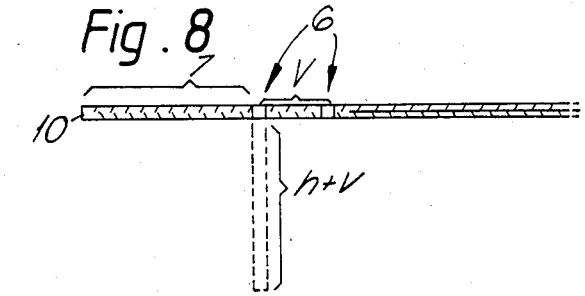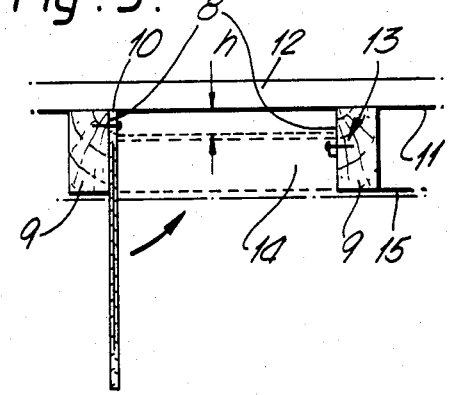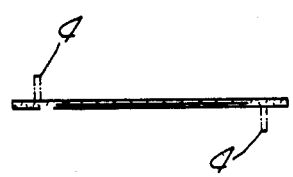

Fig. 9.A
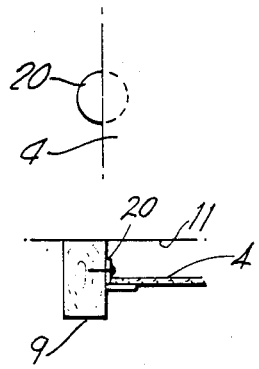
Fig. 9B
Fig. 10.A
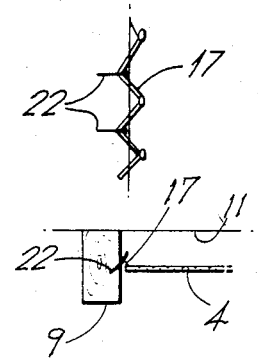
Fig. 10B
Fig. 11.
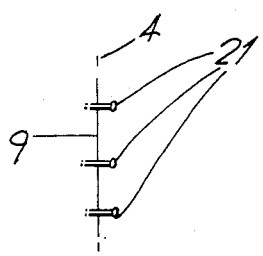
Fig. 12.
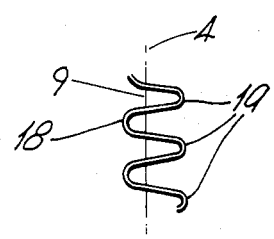
Fig. 13.
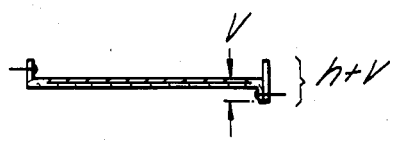

ELECTRICAL HEATING FOIL ELEMENT

BACKGROUND OF THE INVENTION

This invention relates to an electrical heating element and in particular to an electrical heating foil element consisting of a resistance strip element laminated between two sheets of insulation material, where at least one of the insulation sheets extends beyond the heated area at least on one side, so that on this side there is obtained an insulated fastening area (nailing zone) which can be mechanically reinforced.

Such an electrical heating element is known from Norwegian Pat. No. 147,975 to H. A. Bergersen.

When such a heating element is to be installed within a floor structure, it is usually arranged on the top of an insulation mat with a free air space having a specified minimum height (specified according to safety conditions) between the element and the floor boards. The heating elements must be arranged according to given specifications.

However, when the floor building process starts with mounting of the floor boards to the top of the joists, some practical problems occur because it is difficult to arrange the insulation mats with the thin and flexible heating elements on top in the correct and specified position from beneath, between the joists. And due to safety requirements on building sites, this floor building method, starting from above, is now common practice.

Normally there are first fastened some bridging supports from joist to joist. These bridging supports are usually made of cardboard or millboard ribbons which are nailed to the side faces of the joists at specified positions. The heating elements are then placed on the top of the bridging supports and finally the insulating mats are fastened and supported from beneath.

This procedure is rather complicated, since the exact position of each bridging support has to be measured out and marked. The bridging supports also represent increased costs and storage capacity.

SUMMARY OF THE INVENTION

The main object of this invention is to provide heating elements which simplify the mounting process.

Another object is to ensure that the specified air space is obtained above each element.

The main features of the invention are defined in the attached claims. The heating element according to the present invention also leads to the following advantages:
standard widths of insulation material may be used,
only one width of heating elements has to be produced.

BRIEF DESCRIPTION OF THE DRAWING

Above-mentioned and other features and objects of this invention will become more apparent by reference to the following description taken in conjunction with the accompanying drawing(s), in which:

FIG. 1 illustrates a heating element according to this invention.

FIG. 2 shows the element of FIG. 1 from one end.

FIG. 3 illustrates the mounting process of a heating element according to the invention.

FIGS. 4–8 illustrate in more detail some specific solutions of the easy-to-fold zone of the element according to this invention;

FIGS. 9–12 show some details of different fastening devices for the element according to this invention; and FIG. 13 illustrates more than one easy-to-fold zone alone one side of the element.

DETAILED DESCRIPTION OF THE PREFERRED EMBODIMENT

In FIG. 1 a heating foil element 1 consists of a resistance strip 2 embedded in a laminated structure. The resistance strip 2 is arranged as a continuous, meander-shaped path, e.g. between two films of plastic, but in the drawings only the outer parts are shown for drawing convenience. The resistance strip 2 is equipped with a terminal 3 through which power is provided. The element 1 is provided with conventional side portions or so-called nailing zones 4 preferably reinforced by means of an inserted reinforcing element 5. Between the strip 2 and the reinforced nailing zone 4, or within the nailing zone 4, there is according to this invention arranged an easy-to-fold zone 6 which defines a brim 7 on the side portion 4 of the element. This easy-to-fold zone 6 shall have such a character that it may easily be bent least 90 degrees without any distorting effect. However, the easy-to-fold zone shall preferably also have such a character that when it is desired to split the element along the easy-to-fold zone, this may easily be done, preferably without any tool, simply by tearing. It should also be mentioned that it is deemed advantageous that the width of the brim 7 outside the easy-to-fold zone 6 corresponds to the specified free height which has to be arranged above the element when mounted in a floor structure.

In FIGS. 2 and 3 the principle of mounting such a heating element is shown. The element 1 is simply nailed along its nailing zone 4 to the side face 8 of its respective joist 9, hanging freely downwards. As the edge 10 of the element is nailed quite nearly up to the lower face 11 of the floor boards 12, the correct height of the free space is obtained when the element is bent 90 degrees upwardly along its easy-to-fold zone 6 and its opposite reinforced nailing zone 4 is nailed to the adjacent joist (at 13). At the latter joist the edge portion of the element may be bent downwardly along the easy-to-fold zone, as shown.

In a somewhat different embodiment it is proposed to arrange at least two easy-to-fold zones 6 along one or both side edges of the element at predetermined positions. This is partly done to allow adjustments of the width of the element according to different joist distances, partly to obtain a positive definition of the height "h" also along the last mounted side edge and partly to strengthen the nailing zone which then consists of a double laminate structure. This embodiment is shown in FIG. 13.

Thus the correct distance from the floor boards 12 is obtained without using any additional auxilliary means.

When the heating element 1 is fastened in a correct, specified position, an insulation mat 14 and its support 15 may be arranged according to conventional tecnique (FIG. 3).

If the element 1 is to be arranged instead within the floor structure from above, the possibly reinforced brim portions 7 may easily be torn off or folded to adjust the width of the heating element to the available distance between the joists 9.

The easy-to-fold zones 6 may be modified in many different ways, within the scope of the present invention. Thus zone may comprise perforations of different kinds (pin-holes, cuts or the like, as shown in FIGS. 4, 7 and 8) or may simply consist of the line-shaped impression (as shown in FIG. 5) or a combination of both. An easy-to-fold zone may also be obtained simply by omitting or weakening the reinforcement along this zone (as shown in FIG. 6), since the reinforcement in itself may increase the stiffness of the laminate structure. If the easy-to-fold zone is not visible due to its own structure, it may preferably be marked by a line or the like. An easy-to-fold zone may also be provided simply by pre-folding the laminate at the desired position.

It may also be advantageous to have a part 16 of the reinforcing element 5 on the inside of the (or the innermost) easy-to-fold zone 6, e.g. a simple thread (as shown in FIG. 5), to avoid tearing of the central portion of the heating element, including the resistance strip 2 itself.

The embodiments above have been shown with nailing zones and therefore it has been assumed that the side portions 4 should be nailed to the joists 9. Other fastening devices could, however be used, and some alternative means are shown in FIGS. 9–12.

In FIG. 9 there is shown fastening tugs 20 which may be welded to the side portion 4 at predetermined intervals. These tugs may then be nailed to the joist or may be hooded onto corresponding catching devices on the joist (not shown). In FIG. 10 there is shown a string 17 passing through holes in the side portion(s) 4. This string may then be hooked on catching devices 22 fastened to the joists 9.

In FIG. 11 the catching devices, still designated as 22, may be hooked directly into perforations 21 in the side portion 4, and in FIG. 12 loops 19 are made e.g. by welding a monofilament element in waves between the two insulating sheets so that protruding slings 18 are obtained which again may be hooked onto catching devices (not shown).

The perforations or impression constituting the zone 6 may be obtained by means of a rotating tool with or without irregularities to provide identations in the films or in the complete laminate, or to weaken same along the easy-to-fold zone. This tool may be arranged either before or after the laminating process which is included in the manufacturing of the heating elements. During this process sharp knives or pins or even a smooth wheel may be pressed towards the foil or laminate with or without applied heat.

While I have described above the priciples of my invention in connection with specific apparatus, it is to be clearly understood that this description is made only by way of example and not as a limitation to the scope of my invention as set forth in the objects thereof and in the accompanying claims.

What is claimed is:

1. An electrical heating foil element for mounting on a building structure comprising:
    an electrical resistance foil strip which constitutes a heating zone; and
    a film of insulation material to which said strip is joined, said film having first and second side portions, each of said side portions extending along the length of said strip beyond said heating zone for mounting the element and means extending along the length of said side portions for permitting bending of said first side portion up to an angle of approximately 90° with respect to said heating zone and for bending of said second side portion in a direction substantially opposite to that of said first side portion up to an angle of approximately 90° with respect to said heating zone, said means being located adjacent to and spaced a predetermined distance from said heating zone to provide a predetermined amount of space between the element and a building structure when the element is in a mounted position susbstantially perpendicularly between adjacent supports of the structure.

2. The element as claimed in claim 1 wherein said element further comprises mounting means located on at least one of said side portions for retaining the element in a mounted position.

3. The element as claimed in claim 2 wherein said means includes any one of strings, slings, loops, hooks and perforations.

4. The element as claimed in claim 1 wherein said film further includes a reinforced section on at least one of said side portions.

5. The element as claimed in claim 4 wherein said reinforced section includes a guide extending along the length of the element along which each of the side portions may be bent.

6. The element as claimed in claim 1 wherein said film further includes a reinforced section inwardly of and adjacent to at least one of said side portions.

7. The element as claimed in claim 1 wherein said bending means includes a plurality of perforations.

8. The element as claimed in claim 1 wherein said bending means includes an area of reduced thickness.

* * * * *